US012516353B2

(12) United States Patent
Qin et al.

(10) Patent No.: US 12,516,353 B2
(45) Date of Patent: Jan. 6, 2026

(54) RECOMBINANT HERPESVIRUS OF TURKEYS (HVT) AND PREPARATION METHOD AND USE THEREOF

(71) Applicant: Yangzhou University, Yangzhou (CN)

(72) Inventors: Aijian Qin, Yangzhou (CN); Xusheng Zai, Yangzhou (CN); Bin Shi, Yangzhou (CN); Kun Qian, Yangzhou (CN); Hongxia Shao, Yangzhou (CN); Jianqiang Ye, Yangzhou (CN)

(73) Assignee: Yangzhou University, Yangzhou (CN)

( * ) Notice: Subject to any disclaimer, the term of this patent is extended or adjusted under 35 U.S.C. 154(b) by 940 days.

(21) Appl. No.: 17/719,123

(22) Filed: Apr. 12, 2022

(65) Prior Publication Data

US 2023/0147673 A1 May 11, 2023

(30) Foreign Application Priority Data

Nov. 9, 2021 (CN) ......................... 202111318523.7

(51) Int. Cl.
*C12N 15/86* (2006.01)
*A61K 39/00* (2006.01)
(Continued)

(52) U.S. Cl.
CPC .............. *C12N 15/86* (2013.01); *A61K 39/12* (2013.01); *A61K 39/145* (2013.01); *A61K 39/17* (2013.01);
(Continued)

(58) Field of Classification Search
CPC ........... C12N 2710/16021; C12N 2710/16022; C12N 15/86; C12N 2760/18134;
(Continued)

(56) References Cited

U.S. PATENT DOCUMENTS 10,246,685 B2 4/2019 Ishihara et al.
2023/0031097 A1 2/2023 Langereis et al.

FOREIGN PATENT DOCUMENTS

WO WO-2021123104 A1 * 6/2021 ............. A61K 39/17

OTHER PUBLICATIONS

Das, Moushumee, and Sachin Kumar. "Evidence of Independent Evolution of Genotype XIII Newcastle Disease Viruses in India." Archives of Virology, vol. 162, No. 4, Dec. 29, 2016, pp. 997-1007, https://doi.org/10.1007/s00705-016-3182-3. Accessed Nov. 12, 2023. (Year: 2016).*

(Continued)

*Primary Examiner* — Ram R Shukla
*Assistant Examiner* — Africa M Mcleod
(74) *Attorney, Agent, or Firm* — C. Tumey Law Group, PLLC

(57) ABSTRACT

The present disclosure provides a recombinant herpesvirus of turkeys (HVT) and a preparation method and use thereof. The present disclosure specifically provides a recombinant HVT, where an exogenous gene is inserted in a spacer region between an HVT005 region and an HVT006 region of an HVT genome; and the exogenous gene is selected from a gene derived from the group consisting of a Newcastle disease virus (NDV), an avian influenza virus (AIV), and an infectious bursal disease virus (IBDV); the spacer region between an HVT005 region and an HVT006 region of an HVT genome is located between 8,867 nt and 9,319 nt of the HVT genome, and has a nucleotide sequence set forth in SEQ ID NO: 1.

6 Claims, 8 Drawing Sheets

Specification includes a Sequence Listing.

(51) Int. Cl.
*A61K 39/12* (2006.01)
*A61K 39/145* (2006.01)
*A61K 39/17* (2006.01)
*A61P 31/14* (2006.01)
*A61P 31/16* (2006.01)
*C12N 5/073* (2010.01)
*C12N 7/00* (2006.01)
*C12N 9/22* (2006.01)
*C12N 15/11* (2006.01)

(52) U.S. Cl.
CPC ............... *A61P 31/14* (2018.01); *A61P 31/16* (2018.01); *C12N 5/0603* (2013.01); *C12N 7/00* (2013.01); *C12N 9/22* (2013.01); *C12N 15/11* (2013.01); *A61K 2039/5256* (2013.01); *A61K 2039/53* (2013.01); *C12N 2310/20* (2017.05); *C12N 2710/16021* (2013.01); *C12N 2710/16022* (2013.01); *C12N 2710/16034* (2013.01); *C12N 2710/16043* (2013.01); *C12N 2710/16343* (2013.01); *C12N 2720/00034* (2013.01); *C12N 2720/10021* (2013.01); *C12N 2720/10022* (2013.01); *C12N 2720/10034* (2013.01); *C12N 2720/10071* (2013.01); *C12N 2760/16121* (2013.01); *C12N 2760/16122* (2013.01); *C12N 2760/16134* (2013.01); *C12N 2760/16171* (2013.01); *C12N 2760/18121* (2013.01); *C12N 2760/18122* (2013.01); *C12N 2760/18133* (2013.01); *C12N 2760/18134* (2013.01); *C12N 2760/18171* (2013.01); *C12N 2800/107* (2013.01); *C12N 2800/80* (2013.01)

(58) Field of Classification Search
CPC ........... C12N 2710/16343; C12N 2710/16011; C12N 2710/16034; A61K 39/17; A61K 2039/53
See application file for complete search history.

(56) References Cited

OTHER PUBLICATIONS

Madbouly, Yahia, et al. “Genotyping and Genetic Evolution Analysis of Newly Isolated Newcastle Disease Virus in Egypt.” Slovenian Veterinary Research, vol. 58, Dec. 17, 2021, https://doi.org/10.26873/svr-1437-2021. Accessed Jul. 8, 2025. (Year: 2021).*

Sato, Yuko, and Melissa Yates. Committee on Poultry and Other Avian Species. United States Animal Health Association, Oct. 14, 2020. (Year: 2020).*

Wu, Shuang, et al. “Genetic Diversity of Newcastle Disease Viruses Isolated from Domestic Poultry Species in Eastern China during 2005-2008.” Archives of Virology, vol. 156, No. 2, Nov. 9, 2010, pp. 253-261, https://doi.org/10.1007/s00705-010-0851-5. Accessed Nov. 9, 2021. (Year: 2010).*

Xia, Jing, et al. “Genetic and Antigenic Evolution of H9N2 Subtype Avian Influenza Virus in Domestic Chickens in Southwestern China, 2013-2016.” PLoS One, vol. 12, No. 2, Feb. 3, 2017, pp. e0171564-e0171564, https://doi.org/10.1371/journal.pone.0171564. Accessed Jul. 8, 2025. (Year: 2017).*

Chinese First Office Action for CN Patent Application No. 202111318523.7 dated Jun. 9, 2023. English Machine Translation with Original Untranslated Version, PDF file. 10 pages.

Chinese Second Office Action for CN Patent Application No. 202111318523.7 dated Nov. 28, 2023. English Machine Translation with Original Untranslated Version, PDF file. 12 pages.

Afonso, C.L. et al. “The Genome of Turkey Herpesvirus.” The Journal of Virology, vol. 75, No. 2, Jan. 2001, pp. 971-978. PDF file. 8 pages.

He, Xiangjun et al. “Knock-in of large reporter genes in human cells via CRISPR/Cas9-induced homology-dependent and independent DNA repair.” Nucleic Acids Research Journal, vol. 44, No. 9, Feb. 2016, p. e85: pp. 1-14. PDF file. 14 pages.

Qianqian, Wang et al. “Characteristics and Preliminary Applications of Monoclonal Antibodies Against Newcastle Disease Virus Fusion Proteins.” Yangzhou University Jiangsu Provincial Key Laboratory of Animal Preventive Medicine, Report M060573, May 2009. English Machine Translation, PDF file. 69 pages.

Qianqian, Wang et al. “Characteristics and Preliminary Applications of Monoclonal Antibodies Against Newcastle Disease Virus Fusion Proteins.” Yangzhou University, Jiangsu Provincial Key Laboratory of Animal Preventive Medicine, Report M060573, May 2009. Original Untranslated Version with English Abstract, PDF file. 69 pages.

Wan, Zhimin et al. “Identification and analysis of critical amino acids matations in epitopes in hemagglutinin and neuraminidase of H9N2 influenza virus in the pressure of antibody.” Yangzhou University, Report D12041, May 2014. English Machine Translation, PDF file. 136 pages.

Wan, Zhimin et al. “Identification and analysis of critical amino acids matations in epitopes in hemagglutinin and neuraminidase of H9N2 influenza virus in the pressure of antibody.” Yangzhou University, Report D12041, May 2014. Original Untranslated Version with English Abstract, PDF file. 136 pages.

* cited by examiner

SEQUENCE LISTING

<160> NUMBER OF SEQ ID NOS: 25

<210> SEQ ID NO 1
<211> LENGTH: 453
<212> TYPE: DNA
<213> ORGANISM: Artificial Sequence
<220> FEATURE:
<223> OTHER INFORMATION: DNA sequence of the insertion site

<400> SEQUENCE: 1
acccgacatg ggtgtgtata tatagttgta atctcaacta gacgggacct ttaataaacc 60
attataacta tatcgtttgc gcgtagtaac atttccatta atgcacgcca tcgcgttaga 120
cgcacattat gtgtgatagt gtcgcaatag taccacaatc aatttcatat actgaatcgt 180
agggcggcga aaccgttcta tggacaagat ttatacacaa gccacgccct actatccaca 240
ataccacttg tatttcctcc acatcctaga tggcaaggag atgccgttcc gttaacacat 300
caggttaatg cgccgggctg caggcaactt agttgtggta cattccacat ttgtgaacag 360
ttcatactac ctatacagct gactttcttc gaatcccgcc cctgcattgc tcacagttaa 420
taaatacaca atcagtgcat tgtatgccag aca 453

<210> SEQ ID NO 2
<211> LENGTH: 1662
<212> TYPE: DNA
<213> ORGANISM: Artificial Sequence
<220> FEATURE:
<223> OTHER INFORMATION: DNA sequence of the NDV F gene

<400> SEQUENCE: 2
atgggctcca aactttctac caggatccca gcacctctaa tgctgatcac tcggattatg 60
ctgatattga gctgtatccg tctgacaagc tctcttgacg gcaggcctct tgcagctgca 120
ggaattgtag taacaggaga taaggcagtc aatgtataca cctcgtctca gacagggtca 180
atcatagtca agttgctccc gaatatgccc agagataagg aggcgtgtgc aaaagcccca 240
ttagaggcat ataacagaac actgactact ttgctcactc ctcttggcga ctccatccgc 300
aagatccaag ggtctgtgtc cacgtctgga ggagggagac aggggcgcct tataggtgct 360
gttattggca gtgtagctct tggggttgca acagcggcac agataacagc agctgcggcc 420
ctaatacaag ccaaccagaa tgccgccaac atcctccggc ttaaggagag cattgctgca 480
accaatgaag ctgtgcatga agtcaccgac ggattatcac aactatcagt ggcagttggg 540
aagatgcagc agtttgtcaa tgaccagttt aataatacgg cgcgagaatt ggactgtata 600
aaaatcacac aacaggttgg tgtagaactc aacctatacc taactgaatt gactacagta 660
ttcgggccac agatcacctc ccctgcatta actcagctga ccatccaggc actttataat 720

```
ttagctggtg gcaatatgga ttatttatta actaagttag gtatagggaa caatcaactc    780
agctcattaa ttggtagcgg cctgatcact ggttacccta tactgtatga ctcacagact    840
caactcttgg gcatacaagt gaatttgccc tcagtcggga acttaaataa tatgcgtgcc    900
acctatttgg agactttatc tgtaagtaca accaaaggat atgcctcagc acttgtcccg    960
aaagtagtga cacaagtcgg ttctgtgata gaggagcttg acacctcata ctgtatagag   1020
tccgatctgg atttatattg tactagaata gtgacattcc ccatgtcccc aggtatttat   1080
tcctgtttga gcggcaacac atcagcttgc atgtattcaa agactgaagg cgcactcact   1140
acgccgtata tggcccttaa aggctcagtt attgccaatt gtaagataac aacatgtaga   1200
tgtacagacc ctcctggtat catatcgcaa aattatggag aagctgtatc cctgatagat   1260
agacattcat gcaatgtctt atcattagac gggataactc tgaggctcag tggggaattt   1320
gatgcaactt atcaaaagaa catctcaata ctagattctc aagtcatcgt gacaggcaat   1380
cttgatatat caactgaact tggaaacgtc aacaattcaa tcagcaatgc cttggatagg   1440
ttggcagaaa gcaacagcaa gctagaaaaa gtcaatgtca gactaaccag cacatctgct   1500
ctcattacct atattgttct aactgtcatt tctctaattt tcggtgcact tagtctggtt   1560
ttagcgtgtt acctgatgta caaacagaag gcacaacaaa agaccttgct atggcttggg   1620
aataataccc tcgatcagat gagagccact acaagagcat ga                      1662
```

<210> SEQ ID NO 3
<211> LENGTH: 1683
<212> TYPE: DNA
<213> ORGANISM: Artificial Sequence
<220> FEATURE:
<223> OTHER INFORMATION: DNA sequence of the AIV HA gene

<400> SEQUENCE: 3

```
atggaggcag tatcactaat aactatacta ctggtagcaa cagtaagcaa tgcagataaa     60
atctgcatcg gctatcaatc aacaaactcc acagaaactg tggacacact aacagaaaac    120
aatgtccctg tgacacatgc caaagaactg ctccacacag agcataatgg gatgctgtgt    180
gcaacaagct tgggacaacc tcttattttg gacacctgca ccattgaagg gctaatctat    240
ggcaatcctt cttgtgatct atcgctggaa ggaagagaat ggtcctatat cgtcgagaga    300
ccatcagctg ttcacggatt gtgttacccc gggaatgtag aagatctaga agagctaagg    360
tcacttttta gttctgctag gtcttatcaa agaatccaga tcttcccaga cacaatctgg    420
aatgtttctt acgatgggac aagcacagca tgctcaggtt cattctacaa aagcatgaga    480
tggttgactc gaaaaaacgg cgagtaccct acccaagacg cccaatacac aaataatcaa    540
gggaagaaca ttcttttcat gtggggtata aatcacccac ccaccgatga taagcagaga    600
gggctgtaca caagaaccga cacaacaaca agtgtggcaa cggaagaaat aaataggatt    660
ttcaaaccat taatagggcc aaggcctctt gtcaacggtt tgatgggaag aatcaattat    720
tactggtctg tattgaaacc gggtcaaaca ctgcgaataa aatctgatgg gaatctaata    780
gctccatggt atggacacat tctttcagga gagggccacg gaagaattct aaagactgat    840
ttaaaaagag gtagctgcac agtgcagtgt cagacagaaa gaggtggctt aaacacaaca    900
ctgccattcc aaaatgtgag caagtatgca tttggaaact gctcaaaata tattggcata    960
aagagtctca aacttgcagt tggtctgagg aatgtgcctt ctagatctag tagaggacta   1020
ttcggggcca tagcagggtt tatagaggga ggttggccag gactagttgc tggttggtat   1080
```

gggttccagc attcaaatga ccaaggggtt ggtatggcag cagatagaga ctcaacccaa 1140
aaggcaattg ataaaataac atccaaagtg aataacatag tcgacaaaat gaacaagcag 1200
tatgaaatca ttgatcatga attcagtgag gtagaaacta gacttaacat gattaataat 1260
aagattgatg accaaatcca ggatatatgg gcatataatg cagaattgct agttctgctt 1320
gaaaaccaaa aaacactcga tgagcatgac gcaaatgtaa acaatctata taataaagta 1380
aagagggcgt tgggttctaa tgcggtggaa gatgggaaag gatgtttcga gctataccac 1440
aaatgtgatg accaatgcat ggagacaatt cggaacggga cctacaatag gaggaagtat 1500
caagaggaat caaaattaga aagacagaga atagaggggg tcaagctgga atctgaagga 1560
acttacaaaa tcctcaccat ttattcgact gtcgcctcat ctcttgtgat tgcaatgggg 1620
tttgctgcct tcctgttctg ggccatgtct aatgggtctt gcagatgcaa catttgtata 1680
taa 1683

<210> SEQ ID NO 4
<211> LENGTH: 1391
<212> TYPE: DNA
<213> ORGANISM: Artificial Sequence
<220> FEATURE:
<223> OTHER INFORMATION: DNA sequence of the mCMV promoter

<400> SEQUENCE: 4
aactccgccc gttttatgac tagaaccaat agtttttaat gccaaatgca ctgaaatccc 60
ctaatttgca aagccaaacg ccccctatgt gagtaatacg ggactttttt acccaatttc 120
ccaagcggaa agccccctaa tacactcata tggcatatga atcagcacgg tcatgcactc 180
taatggcggc ccatagggac tttccacata gggggcgttc accatttccc agcatagggg 240
tggtgactca atggccttta cccaagtaca ttgggtcaat gggaggtaag ccaatgggtt 300
tttcccatta ctggcaagca cactgagtca aatgggactt tccactgggt tttgcccaag 360
tacattgggt caatgggagg tgagccaatg ggaaaaaccc attgctgcca agtacactga 420
ctcaataggg actttccaat gggtttttcc attgttggca agcatataag gtcaatgtgg 480
gtgagtcaat agggactttc cattgtattc tgcccagtac ataaggtcaa tagggggtga 540
atcaacagga aagtcccatt ggagccaagt acactgcgtc aatagggact ttccattggg 600
ttttgcccag tacataaggt caatagggga tgagtcaatg ggaaaaaccc attggagcca 660
agtacactga ctcaataggg actttccatt gggttttgcc cagtacataa ggtcaatagg 720
gggtgagtca acaggaaagt cccattggag ccaagtacat tgagtcaata gggactttcc 780
aatgggtttt gcccagtaca taaggtcaat gggaggtaag ccaatgggtt tttcccatta 840
ctggcacgta tactgagtca ttagggactt tccaatgggt tttgcccagt acataaggtc 900
aataggggtg aatcaacagg aaagtcccat tggagccaag tacactgagt caatagggac 960
tttccattgg gttttgccca gtacaaaagg tcaatagggg gtgagtcaat gggtttttcc 1020
cattattggc acgtacataa ggtcaatagg ggtgagtcat tgggtttttc cagccaattt 1080
aattaaaacg ccatgtactt tcccaccatt gacgtcaatg ggctattgaa actaatgcaa 1140
cgtgaccttt aaacggtact ttcccatagc tgattaatgg gaaagtaccg ttctcgagcc 1200
aatacacgtc aatgggaagt gaaagggcag ccaaaacgta acaccgcccc ggttttcccc 1260
tggaaattcc atattggcac gcattctatt ggctgagctg cgttctacgt gggtataaga 1320
ggcgcggcca gcgtcggtac cgtcgcagtc ttcggtctga ccaccgtaga acgcagagct 1380
cctcgctgca g 1391

<210> SEQ ID NO 5
<211> LENGTH: 135
<212> TYPE: DNA
<213> ORGANISM: Artificial Sequence
<220> FEATURE:
<223> OTHER INFORMATION: DNA sequence of the SV40 poly A

<400> SEQUENCE: 5
gatccagaca tgataagata cattgatgag tttggacaaa ccacaactag aatgcagtga 60
aaaaaatgct ttatttgtga aatttgtgat gctattgctt tatttgtaac cattataagc 120
tgcaataaac aagtt 135

<210> SEQ ID NO 6
<211> LENGTH: 1673
<212> TYPE: DNA
<213> ORGANISM: Artificial Sequence
<220> FEATURE:
<223> OTHER INFORMATION: DNA sequence of the entire mCMV+polyA element

<400> SEQUENCE: 6
ctagctagca aggccgccta ggccggatcc cccaactccg cccgttttat gactagaacc 60
aatagttttt aatgccaaat gcactgaaat cccctaattt gcaaagccaa acgcccccta 120
tgtgagtaat acggggactt tttacccaat ttcccaagcg gaaagccccc taatacactc 180
atatggcata tgaatcagca cggtcatgca ctctaatggc ggcccatagg gactttccac 240
atagggggcg ttcaccattt cccagcatag ggtggtgac tcaatggcct ttacccaagt 300
acattgggtc aatgggaggt aagccaatgg gtttttccca ttactggcaa gcacactgag 360
tcaaatggga ctttccactg ggttttgccc aagtacattg ggtcaatggg aggtgagcca 420
atgggaaaaa cccattgctg ccaagtacac tgactcaata gggactttcc aatgggtttt 480
tccattgttg gcaagcatat aaggtcaatg tgggtgagtc aatagggact ttccattgta 540
ttctgcccag tacataaggt caataggggg tgaatcaaca ggaaagtccc attggagcca 600
agtacactgc gtcaataggg actttccatt gggttttgcc cagtacataa ggtcaatagg 660
ggatgagtca atgggaaaaa cccattggag ccaagtacac tgactcaata gggactttcc 720
attgggtttt gcccagtaca taaggtcaat agggggtgag tcaacaggaa agtcccattg 780
gagccaagta cattgagtca atagggactt tccaatgggt tttgcccagt acataaggtc 840
aatgggaggt aagccaatgg gtttttccca ttactggcac gtatactgag tcattaggga 900
ctttccaatg ggttttgccc agtacataag gtcaataggg gtgaatcaac aggaaagtcc 960
cattggagcc aagtacactg agtcaatagg gactttccat tgggttttgc ccagtacaaa 1020
aggtcaatag gggtgagtc aatgggtttt tcccattatt ggcacgtaca taaggtcaat 1080
aggggtgagt cattgggttt ttccagccaa tttaattaaa acgccatgta ctttcccacc 1140
attgacgtca atgggctatt gaaactaatg caacgtgacc tttaaacggt actttcccat 1200
agctgattaa tgggaaagta ccgttctcga gccaatacac gtcaatggga agtgaaaggg 1260
cagccaaaac gtaacaccgc cccggttttc ccctggaaat tccatattgg cacgcattct 1320
attggctgag ctgcgttcta cgtgggtata agaggcgcgg ccagcgtcgg taccgtcgca 1380
gtcttcggtc tgaccaccgt agaacgcaga gctcctcgct gcaggcggcc gcggggatcc 1440
agacatgata agatacattg atgagtttgg acaaaccaca actagaatgc agtgaaaaaa 1500
atgctttatt tgtgaaattt gtgatgctat tgctttattt gtaaccatta taagctgcaa 1560

```
taaacaagtt aacaacaaca attgcattca ttttatgttt caggttcagg gggaggtgtg    1620

ggaggttttt tcggatcctc tagagtcgac ggccattatg ccgtttaaa ccc            1673
```

<210> SEQ ID NO 7
<211> LENGTH: 20
<212> TYPE: DNA
<213> ORGANISM: Artificial Sequence
<220> FEATURE:
<223> OTHER INFORMATION: DNA sequence of HVT005/006-sgRNA

<400> SEQUENCE: 7

```
tcatatactg aatcgtaggg                                                  20
```

<210> SEQ ID NO 8
<211> LENGTH: 24
<212> TYPE: DNA
<213> ORGANISM: Artificial Sequence
<220> FEATURE:
<223> OTHER INFORMATION: DNA sequence of HVT005/006-sgRNA-F

<400> SEQUENCE: 8

```
caccgcatat actgaatcgt aggg                                             24
```

<210> SEQ ID NO 9
<211> LENGTH: 24
<212> TYPE: DNA
<213> ORGANISM: Artificial Sequence
<220> FEATURE:
<223> OTHER INFORMATION: DNA sequence of HVT005/006-sgRNA-R

<400> SEQUENCE: 9

```
aaacccctac gattcagtat atgc                                             24
```

<210> SEQ ID NO 10
<211> LENGTH: 20
<212> TYPE: DNA
<213> ORGANISM: Artificial Sequence
<220> FEATURE:
<223> OTHER INFORMATION: Primer U6-F

<400> SEQUENCE: 10

```
gactatcata tgcttaccgt                                                  20
```

<210> SEQ ID NO 11
<211> LENGTH: 24
<212> TYPE: DNA
<213> ORGANISM: Artificial Sequence
<220> FEATURE:
<223> OTHER INFORMATION: Primer HVT005/006-sgRNA-R

<400> SEQUENCE: 11

```
aaacccctac gattcagtat atgc                                             24
```

<210> SEQ ID NO 12
<211> LENGTH: 20
<212> TYPE: DNA
<213> ORGANISM: Artificial Sequence
<220> FEATURE:
<223> OTHER INFORMATION: Primer F(overlap)left-F

<400> SEQUENCE: 12

```
atgggctcca aactttctac                                                  20
```

<210> SEQ ID NO 13
<211> LENGTH: 33

-continued

<212> TYPE: DNA
<213> ORGANISM: Artificial Sequence
<220> FEATURE:
<223> OTHER INFORMATION: Primer F(overlap)left-R

<400> SEQUENCE: 13
gcgcccctgt ctccctcctc cagacgtgga cac 33

<210> SEQ ID NO 14
<211> LENGTH: 40
<212> TYPE: DNA
<213> ORGANISM: Artificial Sequence
<220> FEATURE:
<223> OTHER INFORMATION: Primer F(overlap)right-F

<400> SEQUENCE: 14
gagggagaca ggggcgcctt ataggtgctg ttattggcag 40

<210> SEQ ID NO 15
<211> LENGTH: 20
<212> TYPE: DNA
<213> ORGANISM: Artificial Sequence
<220> FEATURE:
<223> OTHER INFORMATION: Primer F(overlap)right-R

<400> SEQUENCE: 15
tcatgctctt gtagtggctc 20

<210> SEQ ID NO 16
<211> LENGTH: 34
<212> TYPE: DNA
<213> ORGANISM: Artificial Sequence
<220> FEATURE:
<223> OTHER INFORMATION: Primer NotI-F-F

<400> SEQUENCE: 16
atttgcggcc gcatgggctc caaactttct acca 34

<210> SEQ ID NO 17
<211> LENGTH: 35
<212> TYPE: DNA
<213> ORGANISM: Artificial Sequence
<220> FEATURE:
<223> OTHER INFORMATION: Primer NotI-F-R

<400> SEQUENCE: 17
atttgcggcc gctcatgctc ttgtagtggc tctca 35

<210> SEQ ID NO 18
<211> LENGTH: 165
<212> TYPE: DNA
<213> ORGANISM: Artificial Sequence
<220> FEATURE:
<223> OTHER INFORMATION: Primer sgA- SfiI-F

<400> SEQUENCE: 18
gagatcgagt gccgcatcac cggataactt cgtataatgt atgctatacg aagttattta 60
attaaataac ttcgtataat gtatgctata cgaagttatg gccgcctagg ccggcgcgcc 120
gtttaaacgg ccattatggc cgagatcgag tgccgcatca ccgga 165

<210> SEQ ID NO 19
<211> LENGTH: 165
<212> TYPE: DNA
<213> ORGANISM: Artificial Sequence
<220> FEATURE:

<223> OTHER INFORMATION: Primer sgA- SfiI-R

<400> SEQUENCE: 19
ccggtgatgc ggcactcgat ctcggccata atggccgttt aaacggcgcg ccggcctagg 60
cggccataac ttcgtatagc atacattata cgaagttatt taattaaata acttcgtata 120
gcatacatta tacgaagtta tccggtgatg cggcactcga tctca 165

<210> SEQ ID NO 20
<211> LENGTH: 40
<212> TYPE: DNA
<213> ORGANISM: Artificial Sequence
<220> FEATURE:
<223> OTHER INFORMATION: Primer PacI-GFP-F

<400> SEQUENCE: 20
ccttaattaa ggttaattaa tttgctggcc ttttgctcac 40

<210> SEQ ID NO 21
<211> LENGTH: 40
<212> TYPE: DNA
<213> ORGANISM: Artificial Sequence
<220> FEATURE:
<223> OTHER INFORMATION: Primer PacI-GFP-R

<400> SEQUENCE: 21
ccttaattaa ggttaattaa gccgatttcg gcctattggt 40

<210> SEQ ID NO 22
<211> LENGTH: 35
<212> TYPE: DNA
<213> ORGANISM: Artificial Sequence
<220> FEATURE:
<223> OTHER INFORMATION: Primer NotI-HA-F

<400> SEQUENCE: 22
atttgcggcc gcatggaggc agtatcacta ataac 35

<210> SEQ ID NO 23
<211> LENGTH: 35
<212> TYPE: DNA
<213> ORGANISM: Artificial Sequence
<220> FEATURE:
<223> OTHER INFORMATION: Primer NotI-HA-R

<400> SEQUENCE: 23
atttgcggcc gcttatatac aaatgttgca tctgc 35

<210> SEQ ID NO 24
<211> LENGTH: 21
<212> TYPE: DNA
<213> ORGANISM: Artificial Sequence
<220> FEATURE:
<223> OTHER INFORMATION: Primer HVT-005/006-F

<400> SEQUENCE: 24
tcgtttgcgc gtagtaacat t 21

<210> SEQ ID NO 25
<211> LENGTH: 21
<212> TYPE: DNA
<213> ORGANISM: Artificial Sequence -continued

```
<220> FEATURE:
<223> OTHER INFORMATION: Primer HVT-005/006-R

<400> SEQUENCE: 25

taactgtgag caatgcaggg g                                          21
```

RECOMBINANT HERPESVIRUS OF TURKEYS (HVT) AND PREPARATION METHOD AND USE THEREOF

REFERENCE TO SEQUENCE LISTING

A computer readable ASCII text file entitled "3600-00900-sequence-listing", which was created on Apr. 2, 2022, with a file size of about 14,417 bytes, contains the sequence listing for this application, has been filed with this application, and is hereby incorporated by reference in its entirety.

CROSS REFERENCE TO RELATED APPLICATION

This patent application claims the benefit and priority of Chinese Patent Application No. 202111318523.7, entitled "Recombinant Herpesvirus of Turkeys (HVT) and Preparation Method and Use Thereof" filed on Nov. 9, 2021, the disclosure of which is incorporated by reference herein in its entirety as part of the present application.

TECHNICAL FIELD

The present disclosure belongs to the technical field of genetic engineering vaccines, in particular to a construction method of a recombinant herpesvirus of turkeys (HVT) strain using CRISPR-Cas9 technology. The recombinant virus strain may provide desirable protection as a vaccine.

BACKGROUND ART

As a recently emerging gene editing technology, the CRISPR-Cas9 system has achieved great success in efficient generation of genetically engineered cells and animal models. The CRISPR-Cas9 system is also used to edit genomes of various large DNA viruses, including herpes simplex virus, adenovirus, pseudorabies virus, poxvirus, guinea pig cytomegalovirus, and duck enteritis virus.

Herpesvirus of turkeys (HVT) has been widely used as a vaccine vector to express heterologous antigens of various avian diseases. These vaccines provide desirable and long-lasting immunity against the Marek's disease virus (MDV), and gene-dependent viruses inserted into vectors. However, these recombinant HVT vaccines are mainly produced by conventional homologous recombination in virus-infected cells, or by recombination in bacterial artificial chromosomes (BACs) from which a full-length genome is cloned. These methods are inefficient for producing recombinant viruses, resulting in time-consuming production of the recombinant vaccines. It is of broad technical prospects in efficiently editing genomes of avian herpesviruses using the CRISPR-Cas9 system to quickly generate recombinant viruses.

The insertion sites of HVT for exogenous genes that have been reported include US2, US10, UL45/46, HVT065/066, and TK. The multiple defenses with one vaccine can be achieved by discovering novel sites for HVT to express the exogenous genes, and constructing HVT-based live vector vaccines inserting various exogenous genes based on the existing insertion sites. This method has broad market prospects.

SUMMARY

An objective of the present disclosure is to provide a site HVT005/HVT006 where an exogenous gene is inserted into a HVT.

An aspect of the present disclosure provides a recombinant HVT, in which an exogenous gene is inserted in a spacer region between an HVT005 region and an HVT006 region of an HVT genome; and the exogenous gene is selected from a gene derived from the group consisting of a Newcastle disease virus (NDV), an avian influenza virus (AIV), and an infectious bursal disease virus (IBDV);

in some embodiments, the AIV is selected from an H9N2 subtype AIV, an H5N1 subtype AIV, an H7N7 subtype AIV, an H5N2 subtype AIV, an H7N2 subtype AIV, and an H9N1 subtype AIV; and the NDV is selected from a VII type NDV, a II type NDV, and a III type NDV; and in some embodiments, the exogenous gene is selected from an NDV F gene, an AIV HA gene, and an IBDV VP2 gene.

In some embodiments, the spacer region between an HVT005 region and an HVT006 region of an HVT genome is located between 8,867 nt and 9,319 nt of the HVT, and has a nucleotide sequence preferably set forth in SEQ ID NO: 1.

In some embodiments, the NDV F gene is a complete open reading frame (ORF) of a VII type NDV F gene, and has a cleavage site replaced with a cleavage site of a live vaccine (La Sota strain) of Newcastle disease in chicken.

In some embodiments, the nucleotide sequence of the NDV F gene has a nucleotide sequence set forth in SEQ ID NO: 2.

In some embodiments, an expression cassette of the NDV F gene is ligated successively by an mCMV promoter, the NDV F gene and an SV40 poly A.

In some embodiments, the AIV HA gene is a complete ORF of an H9N2 subtype AIV HA gene.

In some embodiments, the nucleotide sequence of the H9N2 subtype AIV HA gene is set forth in SEQ ID NO: 3.

In some embodiments, an expression cassette of the H9N2 subtype AIV HA gene is ligated successively by an mCMV promoter, the exogenous gene and an SV40 poly A.

The present disclosure further provides a method for preparing the recombinant HVT, including the following steps:

S1) Construction of a CRISPR-Cas9 plasmid:

S1-1) designing an sgRNA sequence for the spacer region between an HVT005 region and an HVT006 region, in which the sgRNA sequence is set forth in SEQ ID NO: 7, TCATATACTGAATCGTAGGG (SEQ ID NO: 7); and S1-2) synthesizing a plus-strand HVT005/006-sgRNA-F and a minus-strand HVT005/006-sgRNA-R according to the designed sgRNA sequence, and conducting annealing to form a dsDNA, and inserting the dsDNA into a vector to obtain the CRISPR-Cas9 plasmid; in which sequences of the plus-strand HVT005/006-sgRNA-F and the minus-strand HVT005/006-sgRNA-R are set forth in SEQ ID NO: 8 and SEQ ID NO: 9, respectively:

| Name | Sequence |
|---|---|
| HVT005/006-sgRNA-F | caccgCATATACTGAATCGTAGGG SEQ ID NO: 8 |
| HVT005/006-sgRNA-R | aaacCCCTACGATTCAGTATATGc SEQ ID NO: 9 |

S2) constructing a donor vector plasmid including an expression cassette of the exogenous gene;

S3) construction and purification of a recombinant HVT: co-transfecting a pX459-sgA plasmid, the CRISPR- Cas9 plasmid and the donor vector plasmid into primary chicken embryo fibroblasts (CEFs), inoculating with an HVT, followed by culturing until the primary CEFs are cytopathic; and conducting purification to obtain a primary recombinant HVT; and S4) removing a green fluorescent protein (GFP) in the primary recombinant HVT obtained in step S3) to obtain the recombinant HVT.

In some embodiments, step S2) includes specifically the following steps:

S2-1) inserting the exogenous gene into a pcDNA3.1-SfiI vector to obtain a pcDNA3.1-SfiI-exogenous gene vector; and S2-2) ligating an expression cassette of the exogenous gene in the pcDNA3.1-SfiI-exogenous gene vector into a pT-sgA-GFP vector through an SfiI restriction site to obtain a pT-sgA-GFP-exogenous gene vector.

In some embodiments, step S4) includes specifically the following steps: transfecting a pcDNA3.1-Cre plasmid in the primary CEFs, inoculating with the primary recombinant HVT obtained in step S3) and conducting culture until the primary CEFs are cytopathic, followed by purification through virus spotting to obtain a recombinant virus rHVT-exogenous gene.

The present disclosure further provides use of the recombinant HVT in preparation of a vaccine for preventing avian influenza and/or Newcastle disease and/or infectious bursal disease.

The present disclosure further provides a vaccine for preventing avian influenza and/or Newcastle disease and/or infectious bursal disease, including the recombinant HVT.

The present disclosure further provides a method for inserting an exogenous gene in an HVT, including inserting the exogenous gene into an HVT genome using a CRISPR-Cas9 technology; in which the exogenous gene is inserted into a spacer region between an HVT005 region and an HVT006 region of the HVT genome;

In some embodiments, an insertion site is located between 8,867 nt and 9,319 nt in the spacer region between an HVT005 region and an HVT006 region of the HVT genome, and the nucleotide sequence of the insertion is set forth in SEQ ID NO: 1; and In some embodiments, the CRISPR-Cas9 technology is achieved by construction of a CRISPR-Cas9 plasmid, including:

S1-1) designing an sgRNA sequence for the spacer region between an HVT005 region and an HVT006 region, in which the sgRNA sequence is set forth in SEQ ID NO: 7, TCATATACTGAATCGTAGGG SEQ ID NO: 7; and S1-2) synthesizing a plus-strand HVT005/006-sgRNA-F and a minus-strand HVT005/006-sgRNA-R according to the designed sgRNA sequence, and conducting annealing to form a dsDNA, and inserting the dsDNA into a vector to obtain the CRISPR-Cas9 plasmid; where sequences of the plus-strand HVT005/006-sgRNA-F and the minus-strand HVT005/006-sgRNA-R are set forth in SEQ ID NO: 8 and SEQ ID NO: 9, respectively:

| Name | Sequence |
|---|---|
| HVT005/006-sgRNA-F | caccgCATATACTGAATCGTAGGG SEQ ID NO: 8 |
| HVT005/006-sgRNA-R | aaacCCCTACGATTCAGTATATGc SEQ ID NO: 9 |

The present disclosure provides a site for inserting an exogenous gene into an HVT genome, that is, the exogenous gene is inserted into a spacer region between an HVT005 region and an HVT006 region of the HVT genome. More specifically, the insertion site is located between 8,867 nt and 9,319 nt in the spacer region between an HVT005 region and an HVT006 region of the HVT genome, and has a nucleotide sequence set forth in SEQ ID NO: 1.

The present disclosure provides a CRISPR/Cas9-based sgRNA guide sequence HVT005/006-sgRNA targeting a HVT005-HVT006 spacer region.

HVT005/006-sgRNA: TCATATACTGAATCGTAGGG (SEQ ID NO: 7).

In the present disclosure, the NDV F gene is a complete ORF of a VII type NDV F gene, and has a cleavage site replaced with a cleavage site of a live vaccine (La Sota strain) of Newcastle disease in chicken. The nucleotide sequence of the NDV F gene is set forth in SEQ ID NO: 2. An expression cassette of the NDV F gene is ligated successively by an mCMV promoter, the exogenous gene and an SV40 poly A.

In the present disclosure, the AIV HA gene is a complete ORF of an H9N2 subtype AIV HA gene, having a nucleotide sequence set forth in SEQ ID NO: 3. In some embodiments, an expression cassette the H9N2 subtype AIV HA gene is ligated successively by an mCMV promoter, the exogenous gene and an SV40 poly A.

The mCMV promoter is a mouse-derived mCMV promoter, with a nucleotide sequence set forth in SEQ ID NO: 4. The nucleotide sequence of the SV40 poly A is set forth in SEQ ID NO: 5.

A construction method of a recombinant HVT expressing an NDV F protein, including the following steps: inserting an exogenous gene into an HVT genome using CRISPR-Cas9 technology, and conducting screening and purification to obtain a recombinant virus, namely the recombinant HVT expressing an NDV F protein.

The construction method of the recombinant HVT expressing an NDV F protein includes specifically the following steps:

(1) construction of a CRISPR-Cas9 plasmid, pX330-HVT05/06-sgRNA:

1) designing and synthesizing an sgRNA sequence for an HVT005/006 target site; in which a specific sequence is HVT005/006-sgRNA: TCATATACT-GAATCGTAGGG (SEQ ID NO: 7);

2) annealing synthesized HVT005/006-sgRNA-F and HVT005/006-sgRNA-R sequences to form a dsDNA, and inserting the dsDNA into a pX330 vector (purchased from YouBio) to construct the pX330-HVT05/06-sgRNA;

(2) construction of a donor vector pT-sgA-GFP-F:

1) inserting an F gene fragment into a pcDNA3.1-SfiI vector (referring to 2.2.2.1 of Example) to obtain a pcDNA3.1-SfiI-F vector; and 2) ligating an expression cassette of the F gene in the pcDNA3.1-SfiI-F vector into a pT-sgA-GFP vector through an SfiI restriction site (referring to 2.2.3 of Example) to obtain the pT-sgA-GFP-F vector; and (3) construction and purification of a recombinant HVT, rHVT-F:

1) co-transfecting a pX459-sgA plasmid (referring to 1.1 of Example), a pT-sgA-GFP-F plasmid (referring to 2.2 of Example) and a pX330-HVT005/006-sgRNA plasmid (referring to 2.1 of Example) into primary chickens embryo fibroblasts (CEFs), inoculating with an HVT FC126 strain, conducting culture at 37° C. until the primary CEFs are cytopathic, followed by purification through virus spotting to obtain a recombinant virus rHVT-GFP-F; and
2) transfecting a plasmid pcDNA3.1-Cre (purchased from YouBio) into the primary CEFs, inoculating with the recombinant virus rHVT-GFP-F, conducting culture at 37° C. until the primary CEFs are cytopathic, followed by conducting purification through virus spotting to obtain the recombinant virus rHVT-F, namely the recombinant HVT expressing an NDV F protein.

A construction method of a recombinant HVT expressing an AIV HA protein is the same as the construction method of a recombinant HVT expressing an NDV F protein but the F gene is replaced by the HA gene. Other pathogen-related protective antigen genes can also be constructed according to the same method.

Beneficial Effects

1. In the present disclosure, it is found for the first time that the spacer region between the HVT005 region and the HVT006 region can be used as an insertion site for the exogenous gene of the HVT. The NDV F gene and the AIV HA gene are inserted into the spacer region between the HVT005 region and the HVT006 region of the HVT genome using CRISPR/Cas9 technology, and a vaccine candidate is obtained for prevention of Newcastle disease and avian influenza in chicken.
2. Compared with common homologous recombination, BAC homologous recombination and other technical means, the CRISPR/Cas9 gene knock-in technology is more effective and rapid, which is helpful for rapid construction of an MDV-based recombinant vaccine.
3. The CRISPR/Cas9 is a simple knock-in method, and the designed sgRNA sequence along with the donor plasmid may efficiently insert the target sites.

DETAILED DESCRIPTION OF THE EMBODIMENTS

Figure 1A:
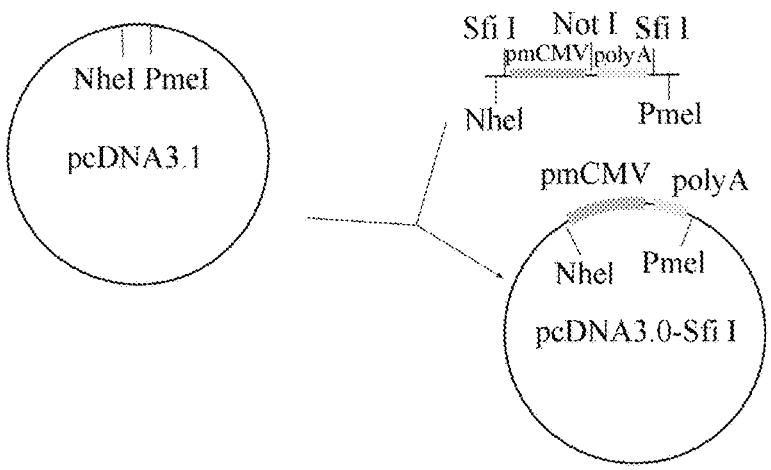
FIGS. 1*a*-1*f* show a schematic diagram of construction of a donor plasmid.
Figure 1B:
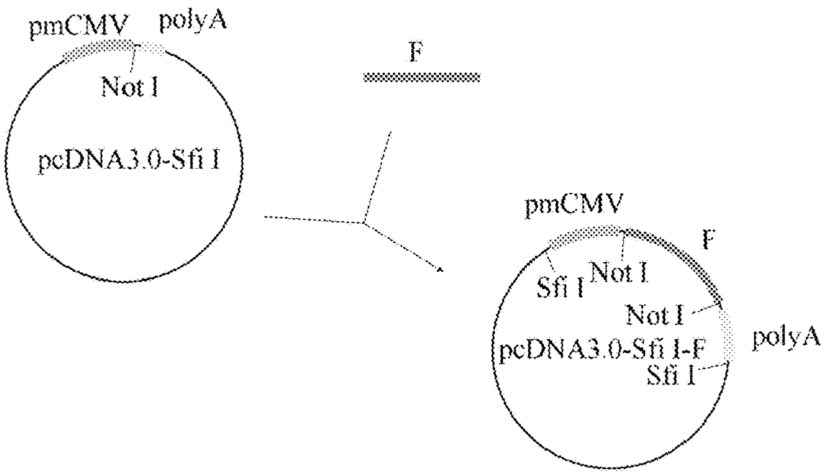
Figure 1C:
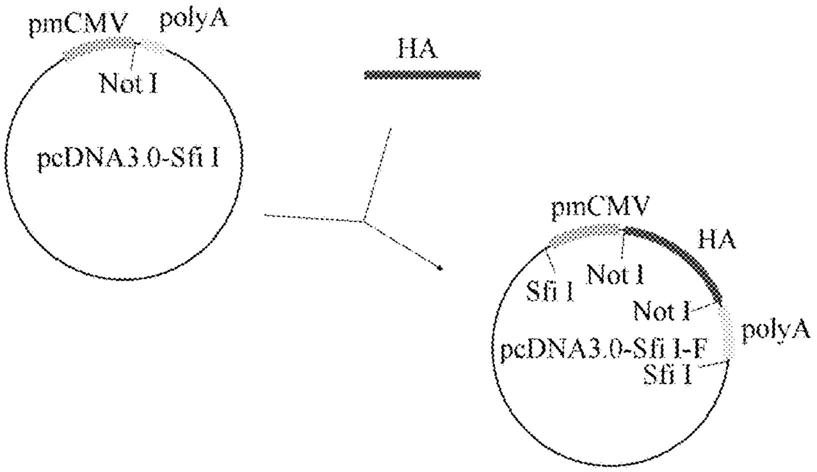
Figure 1D:
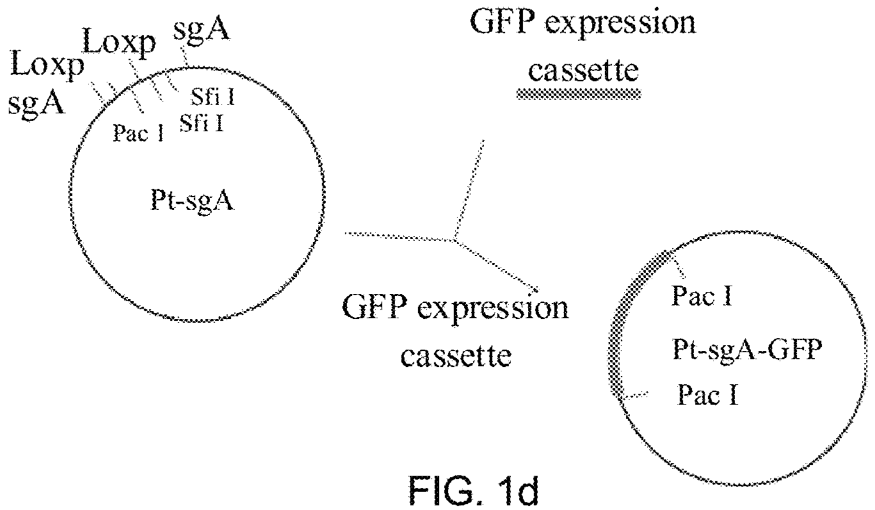
Figure 1E:
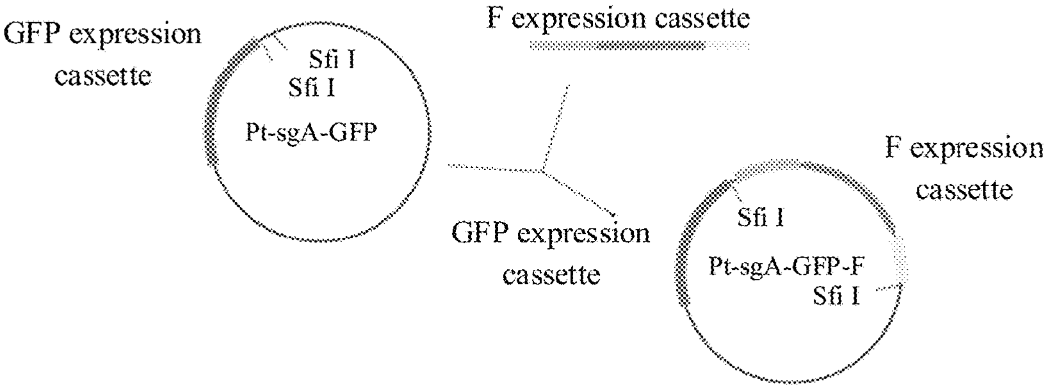
Figure 1F:
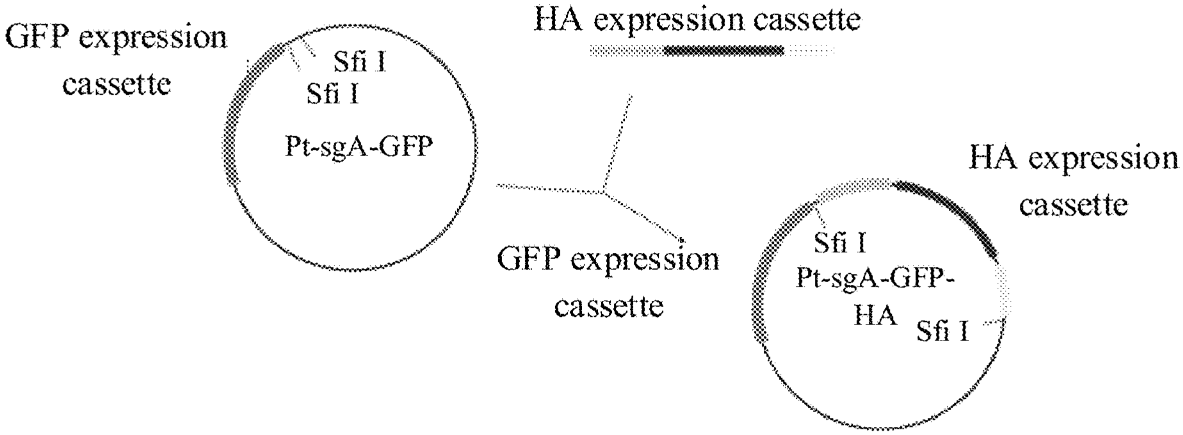
Figure 2:
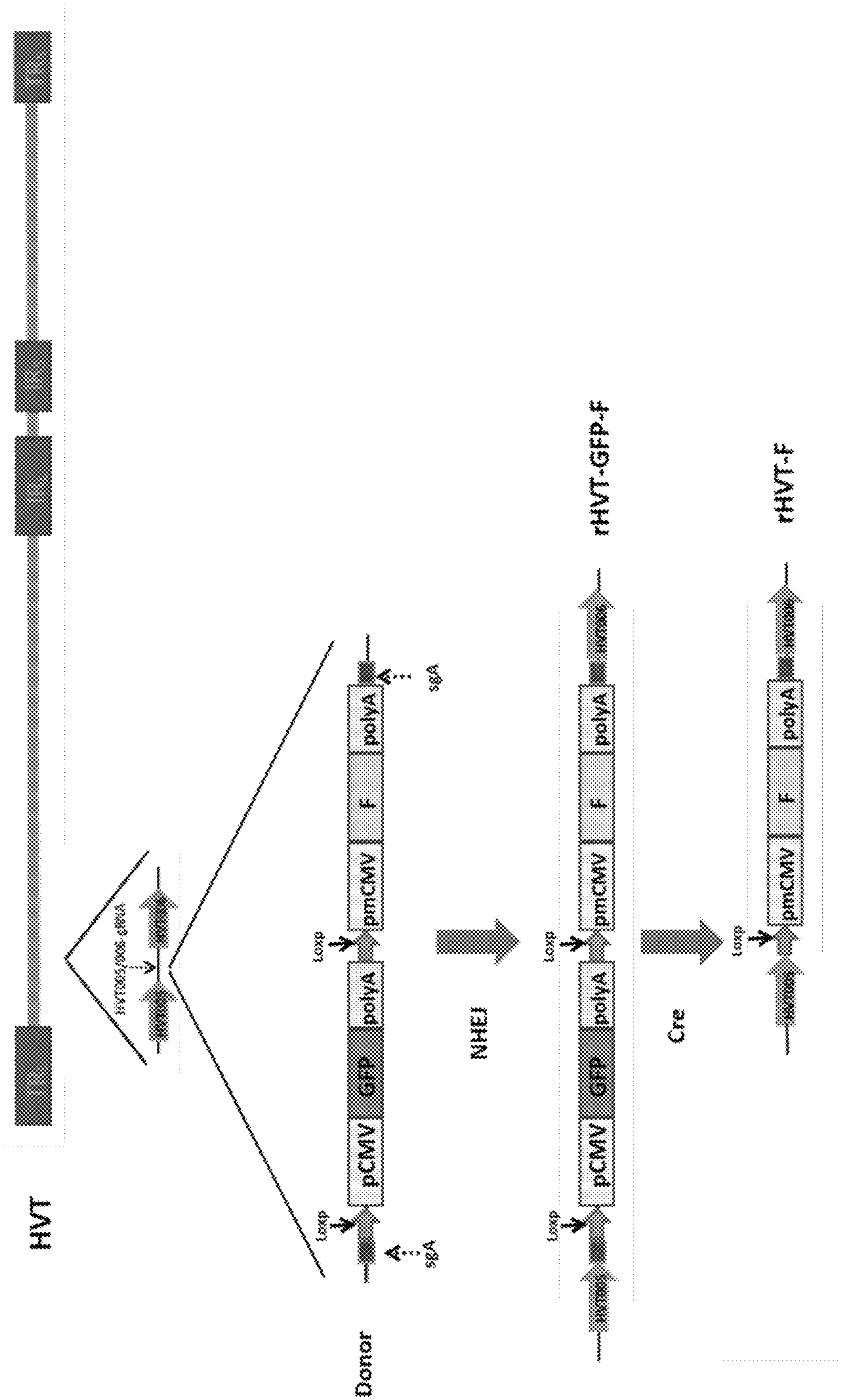
FIG. 2 shows a schematic diagram of construction of a recombinant virus rHVT-F.

The present disclosure will be described in detail below by taking construction of rHVT-F and rHVT-HA as an example.

EXAMPLE

1. Materials 1.1. Strains, Plasmids and Antibodies

An HVT FC-126 vaccine strain, an NDV genotype VII JS strain and an AIV H9N2 (2019) strain were identified and preserved by the Key Laboratory of Avian Preventive Medicine, Ministry of Education, Yangzhou University. All the strains were purchased therefrom.

Plasmids: pX330, pX459, pcDNA3.1 and pcDNA3.1-Cre plasmids were purchased from a website of Hunan Keai Medical Equipment Co., Ltd. (YouBio). The pGEM®-T Easy Vector Systems were purchased from Promega. A plasmid pCMV-N-GFP was purchased from Beyotime Biotechnology. A plasmid pX459-sgA was constructed and preserved by the Key Laboratory of Avian Preventive Medicine, Ministry of Education, Yangzhou University; the plasmid pX459-sgA was obtained by ligating an sgA sequence into the pX459 plasmid through a BbsI restriction site (referring to Knock-in of large reporter genes in human cells via CRISPR/Cas9-induced homology-dependent and independent DNA repair, doi.org/10.1093/nar/gkw064).

Antibodies: anti-HA (H9) monoclonal antibody 2G4 (referring to "Identification and Analysis of Critical Amino Acids Mutations in Epitopes in Hemagglutinin and Neuraminidase of H9N2 Influenza Virus in the Pressure of Antibody", Zhimin Wan) and anti-F (NDV) monoclonal antibody 1D10 (referring to "Characteristics and Preliminary Application of Anti-Newcastle Disease Virus Fusion Protein Monoclonal Antibody", Qianqian Wang) were prepared and preserved by the Key Laboratory of Avian Preventive Medicine, Ministry of Education, Yangzhou University.

2. Methods 2.1. Target Site Design and sgRNA Sequence Synthesis

An exogenous gene was inserted into an HVT005-HVT006 spacer region within the HVT; referring to an HVT005-HVT006 spacer region sequence of a full gene sequence of an HVT FC126 strain (accession number: AF291866) registered in the GenBank, a target-site-based sgRNA was designed using a sgRNA design website (crispr.mit.edu/) to obtain a sgRNA sequence.

| Name | Sequence |
|---|---|
| HVT005/006-SgRNA | TCATATACTGAATCGTAGGG<br>SEQ ID NO: 7 |

A base CACC was added at 5'-end of the sgRNA guide sequence, and a first base T was replaced with G to form a plus-strand sgRNA sequence; the designed sgRNA sequence was reverse-complemented, and a base AAAC was added to the 5'-end to form a minus-strand sgRNA sequence.

| Name | Sequence |
|---|---|
| HVT005/006-sgRNA-F | caccgCATATACTGAATCGTAGGG SEQ ID NO: 8 |
| HVT005/006-sgRNA-R | aaacCCCTACGATTCAGTATATGc SEQ ID NO: 9 |

2.2. Construction of a Targeting Vector:

(1) synthesized HVT005/006-sgRNA-F and HVT005/006-sgRNA-R sequences were annealed to form a dsDNA, in which a reaction system was as follows:

| Name | Volume |
|---|---|
| HVT005/006-sgRNA-F(10 μM) | 1 μL |
| HVT005/006-sgRNA-R(10 μM) | 1 μL |
| Annealing buffer (10×) | 1 μL |
| $ddH_2O$ | 7 μL |

The above system was shaken, centrifuged and placed in a PCR instrument. The PCR protocol consisted of 30 min at 37° C., 5 min at 95° C., gradient cooling at 5° C./min, and then 10 min at 4° C.

(2) The pX330 vector was digested with a BbsI enzyme for linearization, in which a reaction system was as follows:

| Name | Volume |
|---|---|
| Vector pX330 | 1 μg |
| 10 × NEB Buffer | 2 μL |
| BbsI enzyme | 1 μL |
| $ddH_2O$ | Adding to 20 μL |

After incubation at 37° C. for 2 h, a linearized vector pX330 was excised and recovered.

(3) An annealed dsDNA was ligated with the linearized vector pX330, in which a reaction system was as follows:

| Name | Volume |
|---|---|
| Linearized vector pX330 | 0.1 μg |
| dsDNA | 0.2 μL |
| 10 × ligation buffer | 2 μL |
| T4 DNA ligase | 1 μL |
| $ddH_2O$ | Adding to 20 μL |

The above system was shaken, centrifuged, and ligated at 16° C. overnight to obtain a ligated product.

(4) 50 μL of DH5α competent cells (purchased from Nanjing Vazyme Biotech Co., Ltd.) were mixed well with 10 μL of the ligated product, followed by conducting incubation on ice for 30 min. The above mixture was treated in a water bath at 42° C. for 90 sec, and a tube was quickly inserted into ice and allowed to stand for 3 min. 800 μL of an anti-LB-free medium was added to the tube, followed by incubation on a shaker (37° C./150 rpm) for 1 h; 200 μL of a bacterial solution was pipetted and spread evenly on a solid medium containing ampicillin (50 μg/mL) prepared in advance, followed by inverted incubation at 37° C., and transformed clones were formed at 14 h to 16 h.

(5) A plasmid was extracted, and primers were designed according to the vector pX330 and the sgRNA sequence for PCR identification.

| Name | Sequence |
|---|---|
| U6-F | GACTATCATATGCTTACCGT SEQ ID NO: 10 |
| HVT005/006-SgRNA-R | aaacCCCTACGATTCAGTATATGc SEQ ID NO: 11 |

PCR System

| Name | Volume |
|---|---|
| U6-F | 1 μL |
| HVT005/006-sgRNA-R | 1 μL |
| Plasmid | 1 μL |
| $ddH_2O$ | 7 μL |
| Green Taq Mix (Vazyme Biotech) | 10 μL |

The reaction program was as follows: 95° C. for 5 min; 35 cycles of 95° C. for 30 sec, 60° C. for 30 sec, and then 72° C. for 30 sec; and 72° C. for 10 min.

Figure 3:
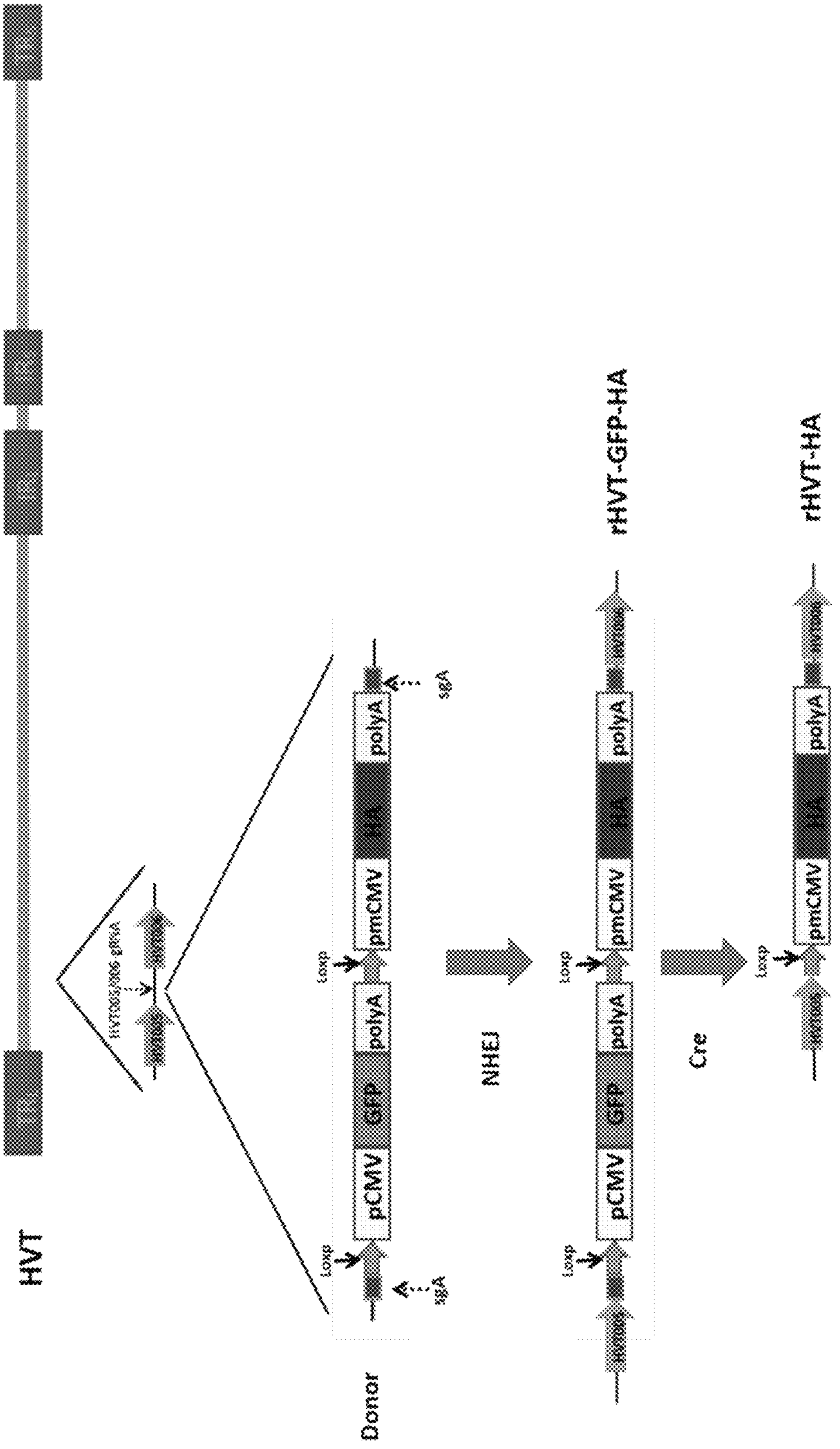
FIG. 3 shows a schematic diagram of construction of a recombinant virus rHVT-HA.
Figure 4:
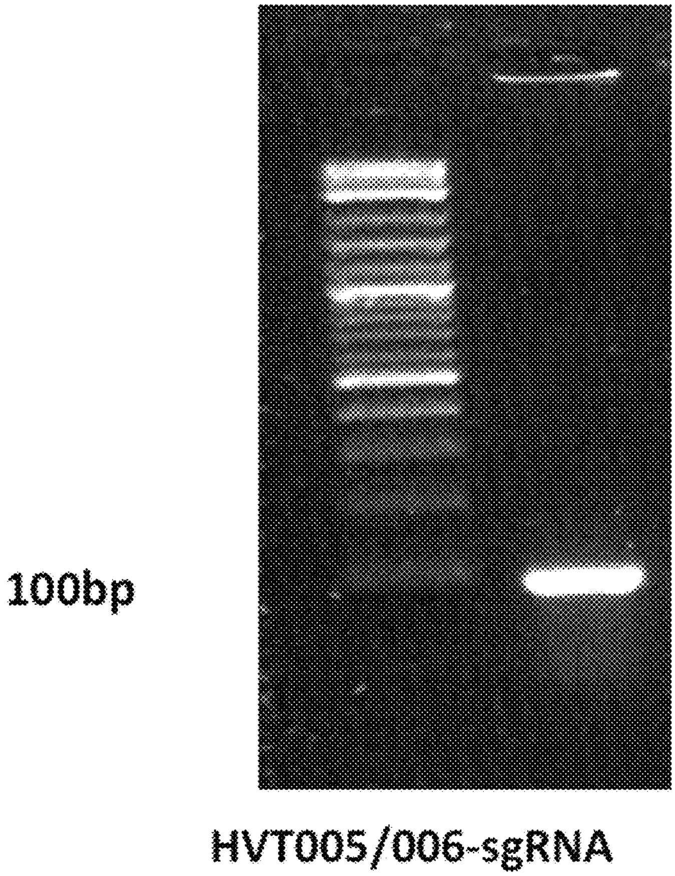
FIG. 4 shows a PCR electrophoresis identification map of a pX330-HVT005/006-sgRNA plasmid.

After the reaction, electrophoresis was conducted with 1% agarose gel (FIG. 3).

2.2. Construction of a Donor Vector pT-sgA-GFP-F 2.2.1. Amplification of NDV F Gene Overlap PCR primers were designed for an F gene sequence of an NDV genotype VII and an F gene cleavage site sequence of an NDV La Sota strain. Primer sequences were as follows:

| Name | Sequence |
|---|---|
| F(overlap)left-F | ATGGGCTCCAAACTTTCTAC SEQ ID NO: 12 |
| F(overlap)left-R | GCGCCCCTGTCTCCC TCCTCCAGACGTGGACAC SEQ ID NO: 13 |
| F(overlap)right-F | GAGGGAGACAGGGGCGCCTTATAGGTGCTGTTATTGGCAG SEQ ID NO: 14 |
| F(overlap)right-R | TCATGCTCTTGTAGTGGCTC SEQ ID NO: 15 |

PCR amplification was conducted on a left fragment of the F gene and a right fragment of the F gene taking a reverse-transcribed cDNA of the NDV genotype VII as a template, and using F(overlap)left-F and F(overlap)left-R, F(overlap)right-F and F(overlap)right-R as primers, respectively; and overlap PCR amplification was conducted on an F gene fragment after replacement of the cleavage site using the left fragment of the F gene and the right fragment of the F gene as templates, and using F(overlap)left-F and F(overlap)right-R were used as primers. The F gene fragment after replacement of the cleavage site had a nucleotide sequence set forth in SEQ ID NO: 2.

Primers were designed with Primer Premier 5.0 software, and an NotI restriction sites were introduced upstream and downstream. Primer sequences were as follows:

| Name | Sequence |
|---|---|
| NotI-F-F | ATTTGCGGCCGCATGGGCTCCAAACTTTCTACCA SEQ ID NO: 16 |
| NotI-F-R | ATTTGCGGCCGCTCATGCTCTTGTAGTGGCTCTCA SEQ ID NO: 17 |

The PCR amplification was conducted on the F gene using the F gene fragment after replacement of the cleavage site as a template, and using NotI-F-F and NotI-F-R as primers; electrophoresis was conducted with 1% agarose gel after the reaction, and a target band was recovered for later use.

2.2.2. Construction of an Eukaryotic Expression Vector pcDNA3.1-SfiI-F 2.2.2.1. Construction of a Plasmid pcDNA3.1-SfiI An mCMV+polyA element for gene sequence synthesis (NheI+SfiI+mCMV+NotI+SV40ployA+SfiI+PmeI) was synthesized, in which an mCMV sequence referred to a mouse cytomegalovirus genome (Murid herpesvirus 1 strain Smith, complete genome, GenBank: GU305914.1, 184,336 nt to 182,946 nt), and the entire element had a nucleotide sequence set forth in SEQ ID NO: 6.

The sequence fragment of mCMV+polyA for gene synthesis was double-digested with NheI and PmeI, and ligated into a pcDNA3.1 plasmid through NheI and PmeI restriction sites to obtain a plasmid pcDNA3.1-SfiI.

2.2.2.2. Construction of a Plasmid pcDNA3.1-SfiI-F

PCR gel recovery products of the F gene in 2.2.1 and the plasmid pcDNA3.1-SfiI were digested with the NotI; after conducting 1% gel electrophoresis, the gel was cut to recover a linearized pcDNA3.1-SfiI-NotI vector and an NotI-F gene fragment. The recovered pcDNA3.1-SfiI-NotI fragment and the NotI-F gene fragment were ligated to construct the plasmid pcDNA3.1-SfiI-F.

2.2.3. Construction of a Donor Vector pT-sgA-GFP-F 2.2.3.1. Construction of a Plasmid pT-sgA A gene sequence (sgA+loxP+PacI+LoxP+SfiI+spacer+SfiI+sgA) was synthesized, in which primers were as follows; sgA-SfiI-F and sgA-SfiI-R were annealed to form dsDNA fragments, and the fragments were ligated into a pGEM-T-easy vector to obtain a pT-sgA vector.

| Name | Sequence |
|---|---|
| sgA-SfiI-F | GAGATCGAGTGCCGCATCACCGGATAACTTCGTATAATGTATGCTATACGAA GTTATTTAATTAAATAACTTCGTATAATGTATGCTATACGAAGTTATGGCCGC CTAGGCCGGCGCGCCGTTTAAACGGCCATTATGGCCGAGATCGAGTGCCG CATCACCGGA SEQ ID NO: 18 |
| sgA-SfiI-R | CCGGTGATGCGGCACTCGATCTCGGCCATAATGGCCGTTTAAACGGCGCGC CGGCCTAGGCGGCCATAACTTCGTATAGCATACATTATACGAAGTTATTTAAT TAAATAACTTCGTATAGCATACATTATACGAAGTTATCCGGTGATGCGGCAC TCGATCTCA SEQ ID NO: 19 |

2.2.3.2. Construction of a Plasmid pT-sgA-GFP

The following primers were designed for a GFP expression cassette:

| Name | Sequence |
|---|---|
| PacI-GFP-F | CCTTAATTAAGGTTAATTAA TTTGCTGGCCTTTTGCTCAC SEQ ID NO: 20 |
| PacI-GFP-R | CCTTAATTAAGGTTAATTAA GCCGATTTCGGCCTATTGGT SEQ ID NO: 21 |

The GFP expression cassette (PacI+CMV promoter+GFP+SV40PolyA+PacI) was amplified using a pCMV-N-GFP plasmid as a template, and using PacI-GFP-F and PacI-GFP-R as primers, and then ligated through a PacI restriction site into a pT-sgA plasmid to obtain the pT-sgA-GFP plasmid.

2.2.3.3. Construction of a Plasmid pT-sgA-GFP-F

The plasmids pcDNA3.1-SfiI-F and pT-sgA-GFP were digested with the SfiI, followed by conducting 1% gel electrophoresis, and an SfiI-F fragment in the pcDNA3.1-SfiI-F vector and a linearized pT-sgA-GFP vector were recovered by gel cutting. The recovered SfiI-F fragment and the pT-sgA-GFP-SfiI fragment were ligated to construct the plasmid pT-sgA-GFP-F.

2.3. Construction of a Donor Vector pT-sgA-GFP-HA 2.3.1. Amplification of AIV HA Gene Primers were designed with Primer Premier 5.0 software, and an NotI restriction sites were introduced upstream and downstream. Primer sequences were as follows:

| Name | Sequence |
|---|---|
| NotI-HA-F | ATTTGCGGCCGCATGGAGGCAGTATCACTAATAAC SEQ ID NO: 22 |
| NotI-HA-R | ATTTGCGGCCGC TTATATACAAATGTTGCATCTGC SEQ ID NO: 23 |

The PCR amplification was conducted on the HA gene using an AIV H9N2 (2019) strain cDNA as a template, and using NotI-HA-F and NotI-HA-R as primers; 1% agarose gel electrophoresis was conducted after the reaction, and a target band was recovered for later use. The HA gene had a nucleotide sequence set forth in SEQ ID NO: 3.

2.3.2. Construction of an Eukaryotic Expression Vector pcDNA3.1-SfiI-HA

PCR gel recovery products of the HA gene in 2.3.1 and the plasmid pcDNA3.1-SfiI (referring to 2.2.2.1 in Example) were digested with the NotI; after conducting 1% gel electrophoresis, the gel was cut to recover a linearized pcDNA3.1-SfiI vector and an NotI-HA gene fragment. The recovered pcDNA3.1-SfiI-NotI fragment and the NotI-HA fragment were ligated to construct the plasmid pcDNA3.1-SfiI-HA.

2.3.3. Construction of a Donor Vector pT-sgA-GFP-HA

The plasmids pcDNA3.1-SfiI-HA and pT-sgA-GFP (referring to 2.2.3.2 in Example) were digested with the SfiI, followed by conducting 1% gel electrophoresis, and an SfiI-HA fragment in the pcDNA3.1-SfiI-HA vector and a linearized pT-sgA-GFP vector were recovered by gel cutting. The recovered SfiI-HA fragment and the pT-sgA-GFP-SfiI fragment were ligated to construct the plasmid pT-sgA-GFP-HA.

2.4. Construction of a Recombinant HVT for Expressing GFP and F Proteins, rHVT-GFP-F 2.4.1. Cell Transfection Before transfection, primary CEF cells were prepared, in which the cells were grown in a 24-well cell culture plate with an M199 medium containing 5% fetal bovine serum; when the cells grew to 80% of a monolayer, they were transfected with TransIT-X2 according to instructions of the TransIT-X2 transfection reagent (Mirusbio), in which a transfection system of each well included 0.25 μg of plasmid pX459-sgA, 0.25 μg of plasmid pT-sgA-GFP-F and 0.25 μg of plasmid pX330-HVT005/006-sgRNA.

2.4.2. Virus Infection 8 h to 12 h after the transfection, the cells were infected with the HVT, in which the virus in each well had an amount of 5,000 PFU. After incubation for 2 d to 3 d at 37° C. and 5% $CO_2$, cells in 1 well were digested with trypsin and inoculated on 2 new CEF 6-well cell culture plates. After incubation for 3 d to 4 d at 37° C. and 5% $CO_2$, the cells were observed under a fluorescence microscope, and viral plaques were selected with green fluorescence.

2.4.3. Purification of a Recombinant Virus rHVT-GFP-F

Figure 5:
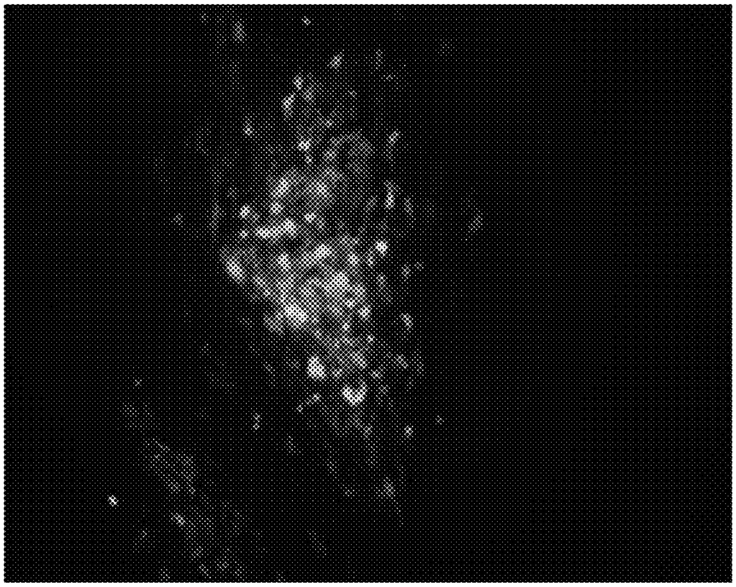
FIG. 5 shows a fluorescence image of a recombinant virus rHVT-GFP-F.

The cells were observed under the fluorescence microscope, the viral plaques with green fluorescence were marked using a marker, and labeled green fluorescence-containing cells were selected by trypsin digestion, and inoculated on a secondary CEF monolayer cells, followed by incubation at 37° C. and 5% $CO_2$ for 3 d to 4 d; the above steps were repeated until all plaques showed fluorescence, and a completely-purified recombinant virus was named rHVT-GFP-F (shown in FIG. 5).

2.5. Construction of a Recombinant HVT for Expressing GFP and HA Proteins, rHVT-GFP-HA 2.5.1. Cell Transfection Before transfection, primary CEF cells were prepared, in which the cells were grown in a 24-well cell culture plate with an M199 medium containing 5% fetal bovine serum; when the cells grew to 80% of a monolayer, they were transfected with TransIT-X2 according to instructions of the TransIT-X2 transfection reagent (Mirusbio), in which a transfection system of each well included 0.25 μg of plasmid pX459-sgA, 0.25 μg of plasmid pT-sgA-GFP-HA and 0.25 μg of plasmid pX330-HVT005/006-sgRNA.

2.5.2. Virus Infection 8 h to 12 h after the transfection, the cells were infected with the HVT, in which the virus in each well had an amount of 5,000 PFU. After incubation for 2 d to 3 d at 37° C. and 5% $CO_2$, cells in 1 well were digested with trypsin and inoculated on 2 new CEF 6-well cell culture plates. After incubation for 3 d to 4 d at 37° C. and 5% $CO_2$, the cells were observed under a fluorescence microscope, and viral plaques were selected with green fluorescence.

2.5.3. Purification of a Recombinant Virus rHVT-GFP-HA

Figure 6:
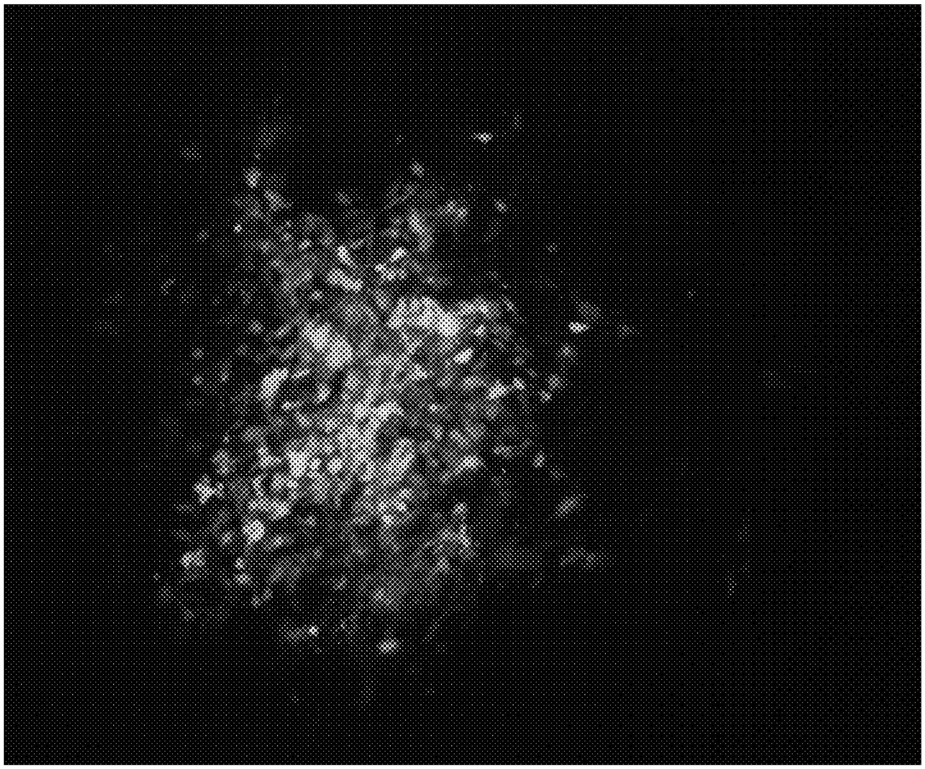
FIG. 6 shows a fluorescence image of a recombinant virus rHVT-GFP-HA.

The cells were observed under the fluorescence microscope, the viral plaques with green fluorescence were marked using a marker, and labeled green fluorescence-containing cells were selected by trypsin digestion, and inoculated on a secondary CEF monolayer cells, followed by incubation at 37° C. and 5% $CO_2$ for 3 d to 4 d; the above steps were repeated until all plaques showed fluorescence, and a completely-purified recombinant virus was named rHVT-GFP-HA (shown in FIG. 6).

2.6. Construction of a Recombinant HVT for Expressing an F Protein, rHVT-F 2.6.1. Cell Transfection Before transfection, primary CEF cells were prepared, where the cells were grown in a 24-well cell culture plate with an M199 medium containing 5% fetal bovine serum; when the cells grew to 80% of a monolayer, they were transfected with TransIT-X2 according to instructions of the TransIT-X2 transfection reagent (Mirusbio), in which a transfection system of each well included 0.5 μg of plasmid pcDNA3.1-Cre.

2.6.2. Virus Infection 8 h to 12 h after the transfection, the cells were infected with the rHVT-GFP-F, in which the virus in each well had an amount of 5,000 PFU. After incubation for 2 d to 3 d at 37° C. and 5% $CO_2$, cells in 1 well were digested with trypsin and inoculated on 2 new CEF 6-well cell culture plates. After incubation for 3 d to 4 d at 37° C. and 5% $CO_2$, the cells were observed under a fluorescence microscope, and viral plaques were selected without green fluorescence.

2.6.3. Purification of a Recombinant Virus rHVT-F

The cells were observed under the fluorescence microscope, the viral plaques without green fluorescence were marked using a marker, and labeled pathological cells were selected by trypsin digestion, and inoculated on a secondary CEF monolayer cells, followed by incubation at 37° C. and 5% $CO_2$ for 3 d to 4 d; the above steps were repeated until all plaques showed no fluorescence, and a completely-purified recombinant virus was named rHVT-F.

2.7. Construction of a Recombinant HVT for Expressing an HA Protein, rHVT-HA 2.7.1. Cell Transfection Before transfection, primary CEF cells were prepared, in which the cells were grown in a 24-well cell culture plate with an M199 medium containing 5% fetal bovine serum; when the cells grew to 80% of a monolayer, they were transfected with TransIT-X2 according to instructions of the TransIT-X2 transfection reagent (Mirusbio), in which a transfection system of each well included 0.5 μg of plasmid pcDNA3.1-Cre.

2.7.2. Virus Infection 8 h to 12 h after the transfection, the cells were infected with the rHVT-GFP-HA, in which the virus in each well had an amount of 5,000 PFU. After incubation for 2 d to 3 d at 37° C. and 5% $CO_2$, cells in 1 well were digested with trypsin and inoculated on 2 new CEF 6-well cell culture plates. After incubation for 3 d to 4 d at 37° C. and 5% $CO_2$, the cells were observed under a fluorescence microscope, and viral plaques were selected without green fluorescence.

2.7.3. Purification of a Recombinant Virus rHVT-HA

The cells were observed under the fluorescence microscope, the viral plaques without green fluorescence were marked using a marker, and labeled pathological cells were selected by trypsin digestion, and inoculated on a secondary CEF monolayer cells, followed by incubation at 37° C. and 5% $CO_2$ for 3 d to 4 d; the above steps were repeated until all plaques showed no fluorescence, and a completely-purified recombinant virus was named rHVT-HA.

2.8. Identification of the Recombinant Virus and Detection of Passage Stability 2.8.1. Indirect Immunofluorescence Assay (IFA)

Figure 7:
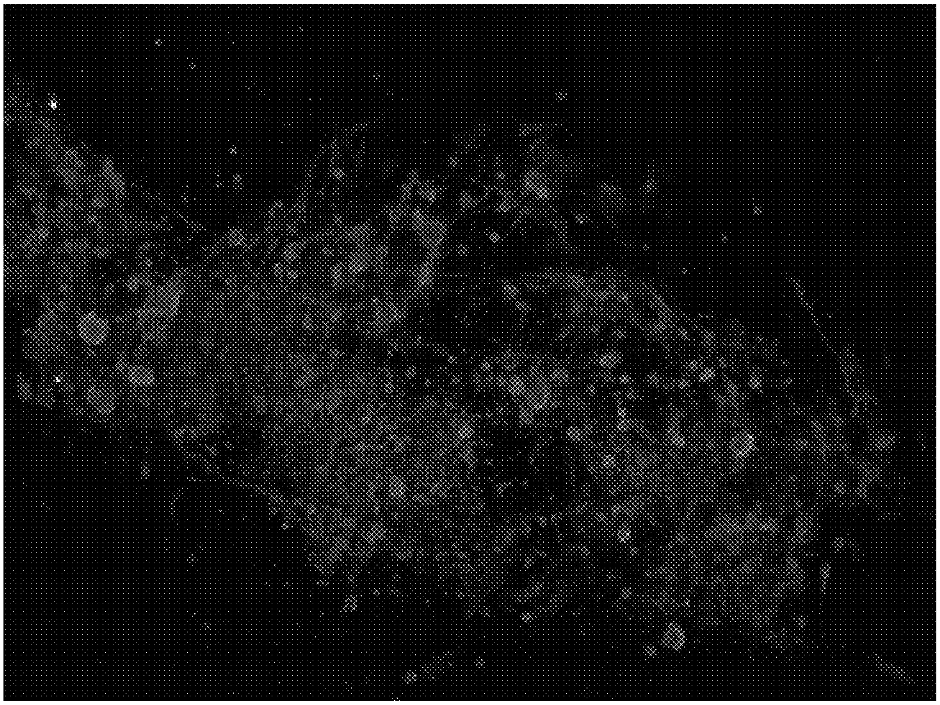
FIG. 7 shows a fluorescence image of the recombinant virus rHVT-F identified by indirect immunofluorescence (IFA)
Figure 8:
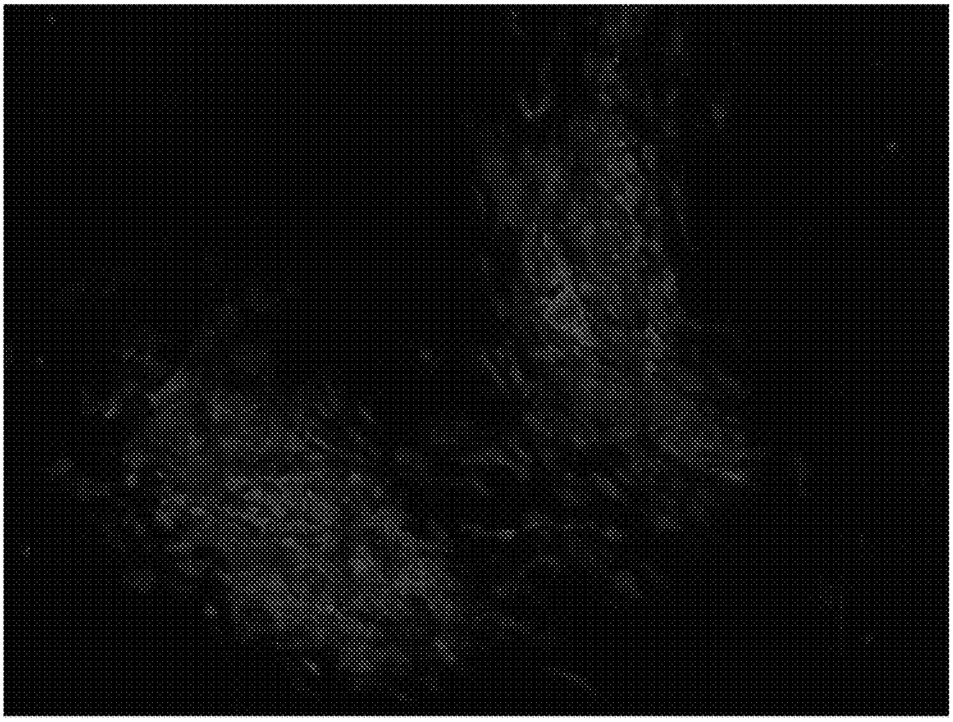
FIG. 8 shows a fluorescence image of the recombinant virus rHVT-HA identified by IFA.

The recombinant virus rHVT-F strain, the recombinant virus rHVT-HA strain and an HVT parental virus were inoculated into a 24-well cell culture plate covered with monolayer CEF, followed by incubation at 37° C. and 5% $CO_2$; after the cells had typical plaques, the medium was discarded, and the cells were fixated with a cold fixative solution of acetone:ethanol (3:2) for 10 min, and washed twice with a PBS; 500 μL (1:200 dilution) of a 1D10 monoclonal antibody was added to the wells inoculated with the rHVT-F strain, 500 μL (1:200 dilution) of a 2G4 monoclonal antibody was added to the wells inoculated with the rHVT-HA strain, 500 μL (1:200 dilution) of the 1D10 monoclonal antibody was added to one well inoculated with the HVT strain, and 500 μL (1:200 dilution) of the 2G4 monoclonal antibody was added to the other well inoculated with the HVT strain. The cells were incubated for 1 h in a constant-temperature incubator at 37° C., and washed three times with the PBS; 500 μL (1:800 dilution) of an Alexa Fluor 594 goat anti-mouse IgG antibody was added to each well, followed by incubation in a 37° C. incubator for 1 h, and then washing three times with the PBS; the cells were observed under a fluorescence microscope. It was showed that specific red fluorescence appeared in the wells infected with the rHVT-F and rHVT-HA strains (shown in FIG. 7 and FIG. 8), while HVT-infected wells had no fluorescence, indicating that the F gene of rHVT-F strain and the HA gene of rHVT-HA strain were correctly expressed.

2.8.2. PCR Detection of the Passage Stability

Figure 9:
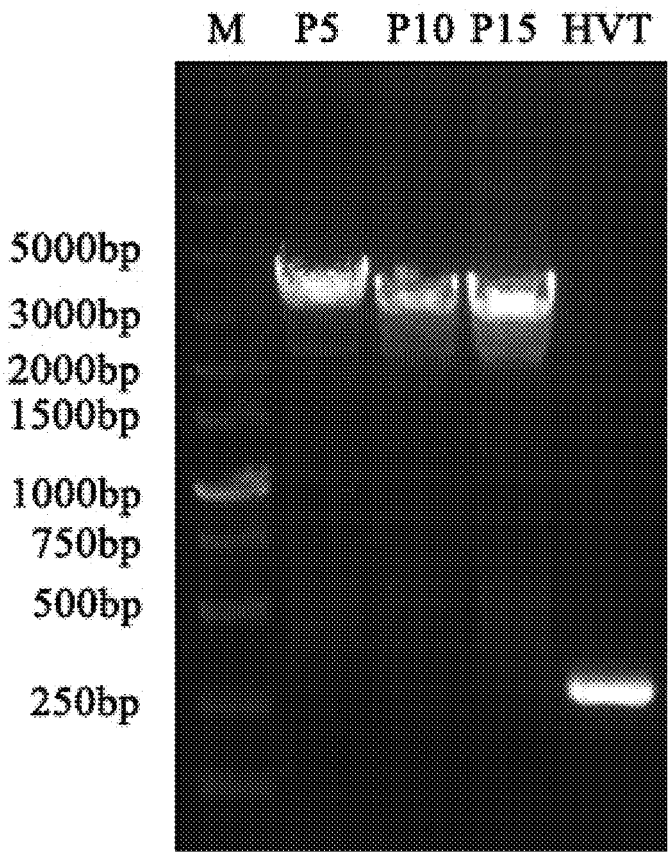
FIG. 9 shows a PCR electrophoresis image of PCR identification of passage stability of the recombinant virus rHVT-F.
Figure 10:
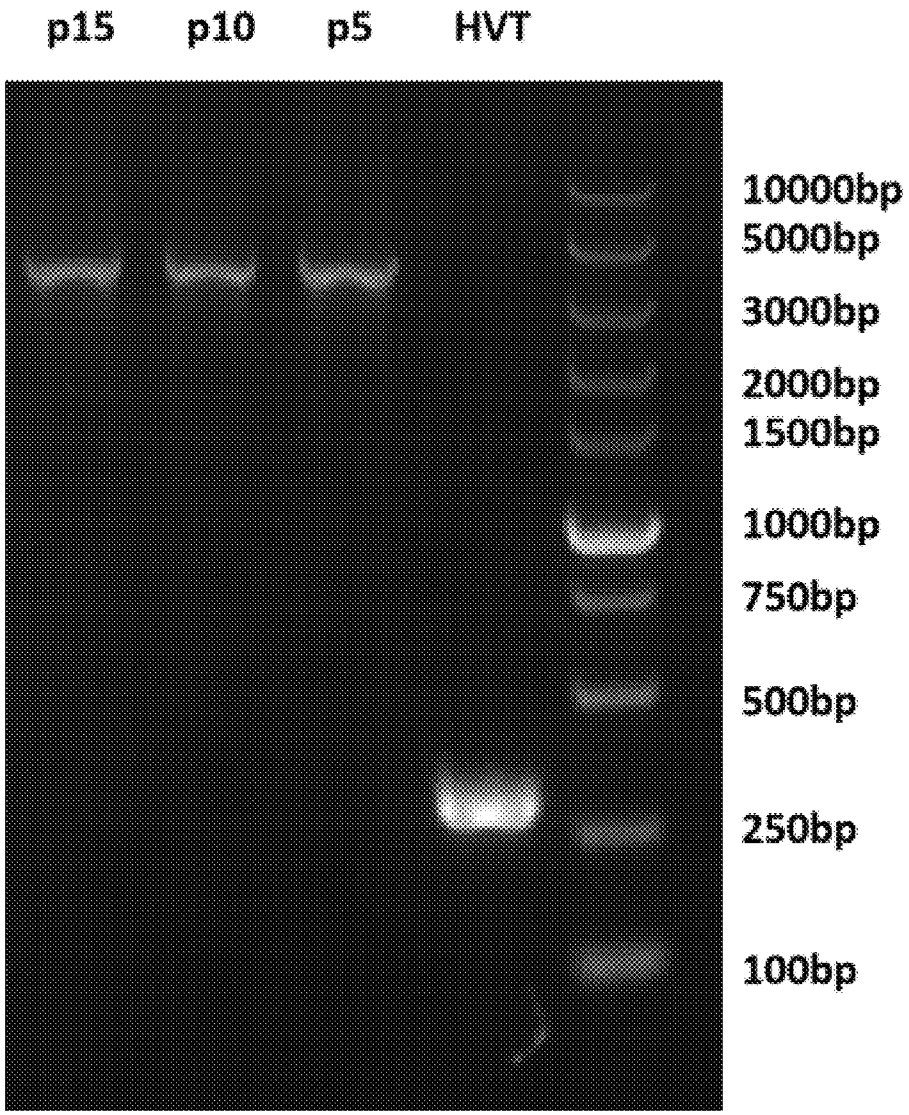
FIG. 10 shows a PCR electrophoresis image of PCR identification of passage stability of the recombinant virus rHVT-HA.

The rHVT-F strain and the rHVT-HA strain were continuously passed on CEF for 15 generations, and the genome of the recombinant virus was extracted every 5 generations; PCR was conducted using the extracted genome as a template and HVT-005/006-F and HVT-005/006-R as primers, and target bands of about 3,500 bp were amplified, respectively (shown in FIG. 9 and FIG. 10). The results showed that the F gene and the HA gene were successfully inserted into the HVT genome without gene loss.

| Name | Sequence |
|---|---|
| HVT-005/006-F | tcgtttgcgcgtagtaacatt<br>SEQ ID NO: 24 |
| HVT-005/006-R | taactgtgagcaatgcagggg<br>SEQ ID NO: 25 |

3. The rHVT-F Strain as a Vaccine 3.1. Amplification of the rHVT-F Strain

CEFs were inoculated into several T75 cell flasks, and inoculated with rHVT-F after 1 d of incubation, and each flask was inoculated with 50,000 PFU of the virus. After inoculation, the virus growth was observed every day; generally, 48 h to 72 h after inoculation, when more than 70% of the monolayer cells had typical cytopathic effects, the cell medium was discarded, and after washing with PBS once, the cells were digested with an appropriate amount of trypsin; when the monolayer cells shrank and were about to separate from the bottle wall, the trypsin was discarded, and the digestion was terminated using an equal amount of a cell medium containing 5% bovine serum. The cells were pipetted with a pipette to make the cells all detached from the bottle wall; after being collected by centrifugation, the cells were resuspended with a cryoprotectant (a cell medium containing 15% bovine serum and 10% DMSO), divided into cryovials at −70° C., and transferred to liquid nitrogen for storage on a second day.

3.2. Immunization of the rHVT-F Strain 18 1-day-old SPF chickens were randomly divided into two groups, namely an rHVT-F group and a challenge control group; in which the rHVT-F group was inoculated with 2,000 PFU/chicken of an rHVT-F recombinant vaccine by intraperitoneal injection at 1 day old, while the challenge control group was inoculated with a vaccine dilution. The two groups of chickens were challenged with a virulent NDV F48E8 strain by intramuscular injection at 28-day-old, with a challenge dosage of $10^5$ $ELD_{50}$/chicken. After the challenge, the incidence and mortality of the chickens in each group were observed and counted every day for two weeks.

3.3. Challenge Protection Effects of rHVT-F Strain-Immunized Chickens

The incidence and mortality of the chickens in each group are shown in the table below. It could be seen that the chickens in the rHVT-F group had a challenge protection rate reaching 100%, while the challenge control group had a challenge protection rate of 0%.

| Group | Mortality (%) | Challenge protection efficiency |
|---|---|---|
| rHVT-F | 0/9 | 100% |
| Challenge control group | 9/9 | 0% |

The results of immune protection evaluation showed that the chickens had a desirable immune protection effect against the virulent NDV strain after immunization with the recombinant HVT, rHVT-F strain.

What is claimed is:

1. A recombinant herpesvirus of turkeys (HVT), wherein an exogenous gene is inserted in a site located at a sequence between nucleotide position 8,867 and position 9,319 of the HVT genome, the sequence having the nucleotide sequence of SEQ ID NO: 1; and wherein the exogenous gene is selected from:

a Newcastle disease virus (NDV) F gene, an avian influenza virus (AIV) HA gene, and an infectious bursal disease virus (IBDV) VP2 gene; and the AIV is selected from an H9N2 subtype AIV, an H5N1 subtype AIV, an H7N7 subtype AIV, and H5N2 subtype AIV, an H7N2 subtype AIV, and an H9N1 subtype AIV; and the NDV is selected from a VII type NDV, a II type NDV, and a III type NDV.

2. The recombinant HVT according to claim 1, wherein the NDV F gene has the nucleotide sequence of SEQ ID NO:2, wherein SEQ ID NO:2 is comprised in an expression cassette, and wherein SEQ ID NO:2 in the expression cassette is operably linked to an mCMV promoter and an SV40 poly A.

3. The recombinant HVT according to claim 1, wherein the AIV HA gene has the nucleotide sequence of SEQ ID NO:3, wherein SEQ ID NO:3 is comprised in an expression cassette, and wherein SEQ ID NO:3 in the expression cassette is operably linked to an mCMV promoter and an SV40 poly A.

4. A vaccine for preventing avian influenza, Newcastle disease, or infectious bursal disease in a chicken, comprising the recombinant HVT according to claim 1.

5. The vaccine according to claim 4, wherein the NDV F gene has the nucleotide sequence of SEQ ID NO:2, wherein SEQ ID NO:2 is comprised in an expression cassette, and wherein SEQ ID NO:2 in the expression cassette is operably linked to an mCMV promoter and an SV40 poly A.

6. The vaccine according to claim 4, wherein the AIV HA gene has the nucleotide sequence of SEQ ID NO:3, wherein SEQ ID NO:3 is comprised in an expression cassette, and wherein SEQ ID NO:3 in the expression cassette is operably linked to an mCMV promoter and an SV40 poly A.

* * * * *